United States Patent Office 3,115,472
Patented Dec. 24, 1963

3,115,472
SOLVENT DEFOAMERS
Chester C. Currie, Midland, Mich., assignor to Dow Corning Corporation, Midland, Mich., a corporation of Michigan
No Drawing. Filed Sept. 14, 1959, Ser. No. 839,574
1 Claim. (Cl. 252—358)

This invention relates to the use of halogeno-alkyl siloxanes for defoaming organic solvents. This application is a continuation-in-part of my copending application Serial No. 723,150, filed March 24, 1958, now abandoned.

The efficacy of silicones as antifoams is now well known. Both aqueous and non-aqueous systems have been successfully defoamed employing siloxanes per se or in emulsion form. By far the most successful siloxane antifoaming agents have been methylsiloxane polymers containing small amounts of fine particle size silica fillers such as fume silica or silica aerogel.

While these antifoams are extremely effective in such fluids as aliphatic hydrocarbon and aqueous solutions, they have little or no defoaming effect on systems employing aromatic solvents, halogenated aliphatic and aromatic solvents, monohydric alcohols above heptyl, lower ethers such as ethyl ether, hydrocarbon-substituted organosilicon compounds and hydrocarbonoxy-substituted organosilicon compounds. In some instances the presence of the above "antifoaming" agents in small amounts in the above types of solvents actually promotes foaming.

The principal object of this invention then is to produce a universal non-foaming solvent system. Another object is to provide a silicone antifoaming agent for those systems in which previously known silicone antifoaming agents are ineffectual.

These objects are satisfied by this invention which relates to a composition of matter comprising an organic solvent containing dispersed therein some incompatible composition comprising a polysiloxane at least 90 percent of the units of which have the formula

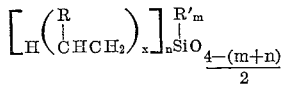

in which each R is a perfluoroalkyl radical of less than eleven carbon atoms, each R' is a monovalent aliphatic hydrocarbon radical of less than 4 carbon atoms, each $x$ has a value of from 1 to 3, each $n$ has a value of from 1 to 3, each $m$ has a value from 0 to 2, and the sum of $n+m$ is no greater than 3. The remaining siloxane units, if any, in the polysiloxane have the unit formula

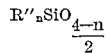

in which each R" is selected from the group consisting of hydrogen atoms, monovalent hydrocarbon radicals and halogenated monovalent hydrocarbon radicals and $n$ is as above defined.

As stated above R can be any perfluoroalkyl radical containing from one to ten carbon atoms, such as $CF_3$—, $C_2F_5$—, $C_3F_7$— and so on up to $C_{10}F_{21}$—. These perfluoroalkyl radicals can be either straight or branch chained radicals. R' can be the methyl, ethyl, propyl, vinyl or allyl radicals, preferably methyl. R" can be hydrogen or any monovalent hydrocarbon radical, such as alkyl radicals, e.g. methyl, ethyl, tert-butyl, 2-ethylhexyl, octadecyl and myricyl; cycloalkyl radicals, e.g. cyclopentyl and cyclohexyl; alkenyl radicals, e.g. vinyl, allyl and butadienyl; cycloalkenyl radicals, e.g. 3,4-cyclopentenyl and 2,3-cyclohexenyl; aryl radicals, e.g. phenyl, xenyl and naphthyl; alkaryl radicals, e.g. tolyl and xylyl, and aralkyl radicals, e.g. benzyl and phenylethyl. R" can also be any monovalent halogenated hydrocarbon radical, for instance, halogenoalkyl radicals such as monochloromethyl, 2,2-dibromoethyl, 5,5,5-trifluoro-2-(trifluoromethyl)amyl and 5,10,15-triodopentadecyl, halogenocycloalkyl radicals such as 1,2-dibromocyclopentyl, 2,3,3-trifluoro-2-chlorocyclobutyl and perchlorocyclohexyl, halogenoalkenyl radicals such as 2-chlorovinyl, 3,3-dibromoallyl and 3-iodobutadienyl, halogenocycloalkenyl radicals such as 3-fluoro-2,3-cyclopentenyl and 3-chloro-4-bromo-3,4-cyclohexenyl, halogenoaryl radicals such as 2,4,6-trifluorophenyl, 4,4'-dibromoxenyl and β-chloronaphthyl, halogenoalkaryl radicals such as α,α,α-trifluorotolyl and 2,4-dibromotolyl, and halogenoaralkyl radicals such as (perfluorophenyl)ethyl, 3,5-diiodobenzyl and α-bromobenzyl.

The value of $n$ can range from 1 to 3 while the value of $m$ ranges from 0 to 2, but the sum of $m+n$ cannot be greater than three. In other words the fluorinated organopolysiloxane employed in this invention can have any of the following siloxane units where Z is the

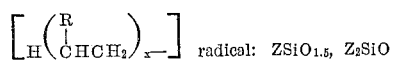 radical: $ZSiO_{1.5}$, $Z_2SiO$

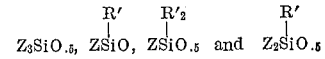

In the radical

$x$ can have a value of from 1 to 3. When $x$ is 1, the radical is ($RCH_2CH_2$—) shown in the copending application Serial No. 594,108, now U.S. Patent No. 2,979,519, of Ogden R. Pierce and George W. Holbrook. When $x$ is more than 1, the radicals are

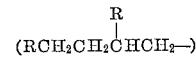

and

shown in the copending application Serial No. 644,479 of Ogden R. Pierce, now U.S. Patent 2,894,969. The teachings of these applications are herein incorporated by reference.

The compositions employed in this invention in which $x=1$ can be prepared starting with the chlorosilanes of the formula

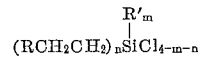

These in turn can be prepared by the reaction of an alkene of the formula $RCH=CH_2$ with a chlorosilane containing from one to 3 silicon-bonded hydrogen atoms in the presence of a peroxide or platinum catalyst at temperatures of from 150° to 300° C.

The olefins can be prepared starting with a perfluoro acid of the formula RCOOH, where R is as above defined, esterifying this acid with ethanol and thereafter reacting the ethyl ester with a mixture of methyl Grignard and isopropyl Grignard to give an alcohol of the formula

This secondary alcohol is then dehydrated by heating with $P_2O_5$ to give the olefin $RCH=CH_2$.

The above method is preferred where the R' groups on the silicon are saturated aliphatic groups. In those cases, however, where R' is an unsaturated aliphatic radical it is preferred to prepare these fluorocarbosiloxanes by the Grignard method. This can be done by reacting the olefins RCH=CH$_2$ with HBr to give the brominated compounds RCH$_2$CH$_2$Br and thereafter preparing a Grignard reagent of these materials which can be then reacted with a chlorosilane of the formula R′$_m$SiCl$_{4-m}$.

The compositions of this invention in which $x$ is 2 or 3 can be prepared by heating a fluoroalkene of the formula RCH=CH$_2$, where R is as above defined, in the presence of any free radical generator capable of activating the olefin, such as peroxides, to form telomers of the formula

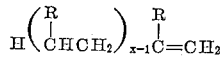

These are subsequently added to the silane of the formula R′$_m$SiH$_n$Cl$_{4-m-n}$ by olefinic addition.

An alternative method is via the Grignard method. This method involves preparing compounds of the formula

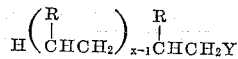

where Y is halogen, forming a Grignard reagent therefrom and reacting it with a silane of the formula

This method is preferred when it is desired to put two different fluorinated radicals on the silicon and/or when R′ is an unsaturated aliphatic radical.

The siloxanes of this invention are best prepared by hydrolyzing either singly or in any mixture the above chlorosilanes, preferably dichlorosilanes with or without monochlorosilanes. If desired, the hydrolysis can be carried out in the presence of solvents such as ethers, toluene, xylene or other hydrocarbons.

The hydrolyzates of the dichlorosilanes can be further polymerized employing alkaline and acidic catalysts according to standard practice.

Another method of preparing the siloxane copolymers is by catalytic copolymerization using mixed siloxanes.

It is to be understood that the siloxanes employed herein can be either homopolymeric materials or copolymeric materials containing two or more different types of siloxane units and further that the organic radicals attached to any one silicon atom can be the same or different as long as they are within the scope of the claim.

Copolymers of the above-defined fluorinated siloxanes can contain up to 10 mol percent siloxane units of the formula

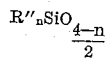

in which R″ and $n$ are as above defined, without the effect of the fluorinated unit being appreciably diminished. These copolymers can be prepared by cohydrolysis of the corresponding chlorosilanes or by the alkaline copolymerization of the corresponding cyclic trisiloxanes.

Specific examples of polysiloxanes which are operative in this invention are homopolymers of

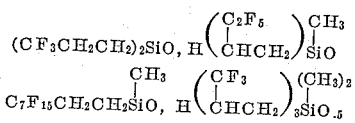

and copolymers such as a copolymer of 50 mol percent

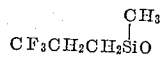

and 50 mol percent

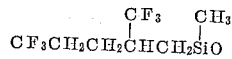

a copolymer of 95 mol percent

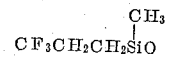

and 5 mol percent diphenylsiloxane, a copolymer of 95 mol percent

4.75 mol percent phenylmethylsiloxane and .25 mol percent methylvinylsiloxane and a copolymer of 90 mol percent

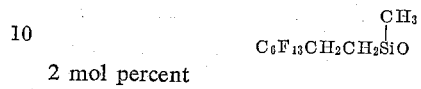

2 mol percent

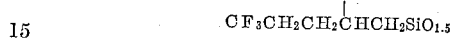

and 8 mol percent dimethylsiloxane.

The molecular size and form of any of the siloxanes employed in this invention is not critical. Thus, such siloxanes can vary from low to high molecular weight fluids, gums and resins as long as they are dispersible in the solvent to be defoamed.

Antifoam compositions prepared from the siloxanes of this invention can contain any suitable filler. The preferred fillers are carbon black and extremely finely divided silicas such as silica aerogels and fume silicas, i.e. those fillers commonly known as reinforcing fillers for elastomers. If desired, the fillers can also be modified by having organosiloxy groups such as trimethylsiloxy groups or alkoxy groups such as ethoxy or isopropoxy groups, attached to the surface thereof.

The specific amount of filler employed is not critical and can vary from 10 parts to over 200 parts per 100 parts of the siloxane polymer.

The antifoam compositions employed herein effectively reduce and/or prevent the foaming of organic solvents with which they are incompatible. Examples of such solvents include benzene, toluene, perchloroethylene, hydrocarbon oils, gasoline, naphtha, mineral oil, high molecular weight polyesters, high molecular weight ethers, e.g. diphenylether, monohydric alcohols above heptyl, especially high molecular weight amines and nitriles and hydrocarbon-substituted and hydrocarbonoxy-substituted organosilicon compounds of the unit formula

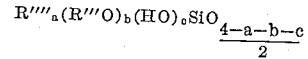

in which each R‴ can be any nonvalent hydrocarbon radical, each R⁗ can be a hydrogen atom or any monovalent hydrocarbon radical R‴, each $a$ and each $b$ can be 0, 1, 2, 3 or 4 and each $c$ can be 0, 1 or 2.

More specifically R‴ can be, for example, any alkyl radical such as the methyl, ethyl, isopropyl, tertbutyl, 2-ethylhexyl, dodecyl, octadecyl, and myricyl radicals; any alkenyl radical such as the vinyl, allyl and hexadienyl radicals; any cycloalkyl radical such as the cyclopentyl and cyclohexyl radicals; and cycloalkenyl radical such as the cyclopentenyl and cyclohexenyl radicals; any aryl radical such as the phenyl, naphthyl and xenyl radicals; any aralkyl radical such as the benzyl, phenylethyl and xylyl radicals and any alkaryl radical such as the tolyl and dimethylphenyl radicals. R⁗ can be any of these R‴ radicals or the hydrogen atoms. Thus the organosilicon solvents which can be effectively defoamed with the antifoam compositions employed herein include, for example, trimethylsiloxy-endblocked dimethylpolysiloxanes, octadecyltri-2-ethylhexoxysilane, diphenylsilanediol, phenylmethylvinylsilanol, ethylpolysilicate, hexa-2-ethylbutoxydisiloxane, dihexyldivinylsilane, tetraphenoxysilane, triethylsilane, tetramethyldisiloxane, tetraallyloxysilane and tetrakis-trimethylsiloxy-silane. These organosilicon compounds are all well known.

The antifoam compositions can be added to the solvent to be defoamed in a solvent solution. The solvent of such solution, however, will affect the defoaming properties of the defoamer. The amount of agitation to foam the test solvent also affects the time of defoaming for a given concentration of a given composition. In addition, the antifoam compositions employed herein are at least as effective as previously known antifoaming agents for defoaming aqueous systems.

The amount of the antifoam compositions employed in this invention necessary to achieve defoaming in the systems is not critical. These compositions have some effect in some systems in amounts down to one part by weight of defoamer per 10 million parts of solvent. Below this amount the effect of the defoamer essentially disappears in all systems. It is preferable that a minimum ratio of at least one part by weight per million be employed. The maximum amount is not critical, but beyond a certain proportion defoaming will not be enhanced.

The following examples are merely illustrative and are not intended to limit this invention which is properly delineated in the claim. All viscosity measurements were made at 25° C.

EXAMPLE 1

The foaming solvent solution employed herein was a 2 percent by weight solution in perchloroethylene of a compound consisting of 30 percent by weight tetrabutylorthotitanate, 30 percent by weight of a methylpolysiloxane copolymer composed of trimethylsiloxane units and SiO$_2$ units in such proportion that the methyl-to-silicon ratio was 1.2:1, 30 percent by weight of a trimethylsiloxy-endblocked dimethylpolysiloxane fluid A having a viscosity of 350 cs. and 10 percent by weight of a trimethylsiloxy-endblocked dimethylpolysiloxane fluid having a viscosity of 30,000 cs.

The antifoaming agents which were compared were 10 percent by weight solutions in acetone of (1) the most effective methylopolysiloxane antifoaming agent hitherto commercially available (2) a hydroxy-endblocked 3,3,3-trifluoropropylmethylpolysiloxane fluid having a viscosity of 570 cs. and (3) a compound consisting of 60 parts by weight of fluid (2), 40 parts by weight of a hydroxy-endblocked 3,3,3-trifluoropropylmethylpolysiloxane polymerized with sulfuric acid to a viscosity of 20,000 cs. and 5 parts by weight of silica filler.

Foam was produced by vigorously agitating four samples of the "foaming solvent solution." Three of these samples contained antifoaming agents (1), (2) or (3) in the minimum amounts necessary to accomplish defoaming in the time shown.

Table I

| Defoamer | Amount of defoamer (p.p.m.) | Foam break time |
|---|---|---|
| Control | | >5 min. |
| (1) | 2,000 | >5 min. |
| (2) | 1,117 | 56 sec. |
| (3) | 78 | 58 sec. |

EXAMPLE 2

To one of three fifty-gram samples of the "foaming solvent solution" of Example 1 was added 0.02 gram of fluid A of Example 1. To the second sample was added 0.02 gram of a hydroxy-endblocked 3,3,3-trifluoropropylmethylpolysiloxane E having a viscosity of 500 cs.

The time elapsed from mixing to the breaking of the foam was as follows:

Table II

| Defoamer | Amount of defoamer (p.p.m.) | Foam break time |
|---|---|---|
| Control | | >5 min. |
| A | 400 | >5 min. |
| E | 400 | 15 sec. |

EXAMPLE 3

Fluids A and E of Examples 1 and 2 were added in the amounts shown to samples of a foaming commercial synthetic organic diester lubricating oil. The results were as follows:

Table III

| Defoamer | Amount of defoamer (p.p.m.) | Foam volume (ml.) |
|---|---|---|
| Control | | 740 |
| A | 27.7 | 245 |
| E | 3.12 | 50 |

EXAMPLE 4

To one of two fifty-gram samples of the foaming solvent solution of Example 1 was added as a 2 percent by weight solution in methylethylketone 0.01 gram of antifoaming agent (1) of Example 1. There was added to the other sample as a 2 percent by weight solution in methylethylketone 0.01 gram of an antifoaming composition (4) consisting of 95 parts by weight of a hydroxy-endblocked 3,3,3-trifluoropropylmethylpolysiloxane polymerized with sodium hydroxide to a viscous liquid and 5 parts by weight of silica filler. Both antifoaming compositions were employed as 2 percent by weight solutions in methylethylketone. The results were as follows:

Table IV

| Defoamer | Amount of defoamer (p.p.m.) | Foam break time, sec. |
|---|---|---|
| (1) | 200 | 120 |
| (4) | 200 | 37 |

EXAMPLE 5

When the following fluids are substituted for fluid E of Example 2, similar excellent results are obtained:

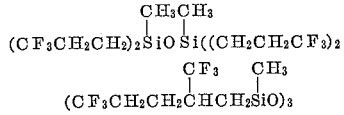

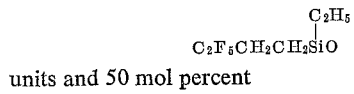

a copolymer of 50 mol percent

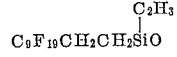

units and 50 mol percent

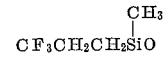

units having a viscosity at 25° C. of 2000 cs.
a copolymer of 90 mol percent $$CF_3CH_2CH_2\underset{|}{\overset{CH_3}{Si}}O$$

units, 4 mol percent HSi(CH$_3$)O units, 3 mol percent (C$_6$H$_5$)(CH$_3$)SiO units, .5 mole percent

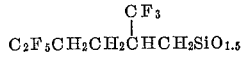

units and 2.5 mol percent (CH$_3$)$_2$SiO units.

EXAMPLE 6

A mixture G was prepared containing 77.48 percent by weight of hexa-2-ethylbutoxydisiloxane, 15.0 percent by weight of di-2-ethylhexylsebacate, 4.5 percent by weight of a trimethylsiloxy-endblocked ethylmethylpolysiloxane having a viscosity of approximately 100,000 cs., 2.0 percent by weight of p,p'-dioctyldiphenylamine (an antioxidant) and 0.02 percent by weight of quinizarin.

A mixture H was prepared, identical to mixture G with the exception that no p,p'-dioctayldiphenylamine was included.

To 180 ml. of mixture G was added 50 parts per million by weight of a trimethylsiloxy-endblocked 3,3,3-trifluoropropylmethylpolysiloxane having a viscosity of approximately 1500 cs. to form mixture J. To 180 ml. of mixture H was added 55 parts per million by weight of trimethylsiloxy-endblocked 3,3,3-trifluoropropylmethylpolysiloxane having a viscosity of approximately 2000 cs. to form mixture K.

Each of these mixtures were foamed and tested according to U.S. Military Specification VV-L-791e, Method 3212, which involves heating the fluid to be tested to 200° F., passing fine air bubbles through it at a rate of 94 ml. per minute for 5 minutes and taking various measurements. The results were as follows:

Table V

| Mixture | Initial vol. (ml.) Foam and Fluid | Foam vol. (ml.) after 5 min. | Collapse of foam to single row of Bubbles |
|---|---|---|---|
| G | 540 | 40 | >25 min. |
| H | 300 | 0.0 | 105 sec. |
| J | 460 | <10 | >13 min. |
| K | 280 | 0.0 | 55 sec. |

EXAMPLE 7

When the following organosilicon compounds are substituted for the hexa-2-ethylbutoxydisiloxane in Example 6, similar results are obtained.

Octadecyltri-2-ethylhexoxysilane
Triethylsilane
Phenylmethylvinylsilanol
Hydroxyl-endblocked dimethylpolysiloxane having a viscosity of 100 cs.

That which is claimed is:

A composition of matter of reduced foaming tendencies consisting essentially of perchloroethylene containing dispersed therein at least one part by weight per 10,000,000 parts by weight of perchloroethylene of an incompatible composition consisting essentially of a polysiloxane, at least 90 percent of the units of which have the formula

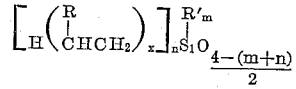

in which each R is a perfluoroalkyl radical of less than 11 carbon atoms, each R' is a monovalent aliphatic hydrocarbon radical of less than 4 carbon atoms, each $x$ has a value from 1 to 3, each $n$ has a value from 1 to 3 and, each $m$ has a value from 0 to 2 and the sum of $n+m$ is no greater than 3, the remaining siloxane units having the unit formula

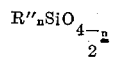

in which each R'' is selected from the group consisting of hydrogen atoms, monovalent hydrocarbon radicals and halogenated monovalent hydrocarbon radicals and $n$ is as above defined.

References Cited in the file of this patent

UNITED STATES PATENTS

| | | |
|---|---|---|
| 2,702,793 | Smith | Feb. 22, 1955 |
| 2,748,180 | Webber | May 29, 1956 |
| 2,761,845 | Rogers et al. | Sept. 4, 1956 |
| 2,813,077 | Rogers et al. | Nov. 12, 1957 |
| 2,894,969 | Pierce | July 14, 1959 |

FOREIGN PATENTS

| | | |
|---|---|---|
| 523,947 | Canada | Apr. 17, 1956 |
| 572,066 | Canada | Mar. 10, 1959 |

UNITED STATES PATENT OFFICE
CERTIFICATE OF CORRECTION

Patent No. 3,115,472             December 24, 1963

Chester C. Currie

It is hereby certified that error appears in the above numbered patent requiring correction and that the said Letters Patent should read as corrected below.

Column 4, line 47, for "nonvalent" read -- monovalent --; column 5, line 35, for "methylopolysiloxane" read -- methylpolysiloxane --; column 6, lines 42 to 44, the formula should appear as shown below instead of as in the patent:

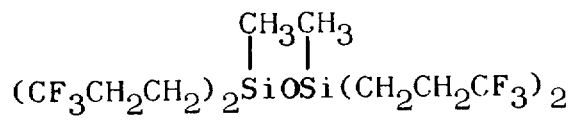

column 7, line 1, for "p,p'-dioctayldiphenylamine" read -- p,p'-dioctyldiphenylamine --; column 8, lines 7 to 9, the formula should appear as shown below instead of as in the patent:

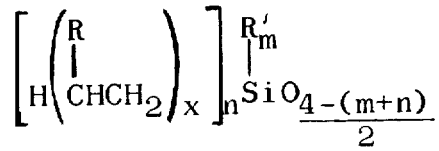

Signed and sealed this 22nd day of December 1964.

(SEAL)
Attest:

ERNEST W. SWIDER             EDWARD J. BRENNER
Attesting Officer             Commissioner of Patents